US008847851B2

(12) United States Patent
Yamamoto

(10) Patent No.: US 8,847,851 B2
(45) Date of Patent: Sep. 30, 2014

(54) HEAD-MOUNTED DISPLAY

(75) Inventor: Masao Yamamoto, Tokyo (JP)

(73) Assignee: Scalar Corporation, Tokyo (JP)

(*) Notice: Subject to any disclaimer, the term of this patent is extended or adjusted under 35 U.S.C. 154(b) by 1082 days.

(21) Appl. No.: 12/522,351

(22) PCT Filed: Dec. 26, 2007

(86) PCT No.: PCT/JP2007/075373
§ 371 (c)(1),
(2), (4) Date: Jan. 25, 2010

(87) PCT Pub. No.: WO2008/084751
PCT Pub. Date: Jul. 17, 2008

(65) Prior Publication Data
US 2010/0164840 A1 Jul. 1, 2010

(30) Foreign Application Priority Data
Jan. 9, 2007 (JP) ................. 2007-001816

(51) Int. Cl.
*G09G 5/00* (2006.01)
*G02B 17/08* (2006.01)
*G02B 27/01* (2006.01)

(52) U.S. Cl.
CPC .......... *G02B 27/0172* (2013.01); *G02B 17/086* (2013.01); *G02B 2027/0158* (2013.01); *G02B 2027/0178* (2013.01); *G02B 2027/0132* (2013.01)
USPC .......................................................... 345/8

(58) Field of Classification Search
USPC ............................................. 345/8
See application file for complete search history.

(56) References Cited

U.S. PATENT DOCUMENTS

| 4,867,551 | A | | 9/1989 | Perera | |
|---|---|---|---|---|---|
| 5,880,773 | A | * | 3/1999 | Suzuki | ............................ 348/115 |
| 6,646,809 | B1 | | 11/2003 | Ishino et al. | |
| 7,148,860 | B2 | | 12/2006 | Kooi et al. | |
| 7,484,843 | B1 | * | 2/2009 | Lin | .................................. 351/80 |
| 7,639,208 | B1 | | 12/2009 | Ha et al. | |
| 2009/0180194 | A1 | * | 7/2009 | Yamaguchi et al. | ........... 359/630 |

FOREIGN PATENT DOCUMENTS

| JP | 09281433 | 10/1997 |
|---|---|---|
| JP | 2001-133724 | 5/2001 |
| JP | 2003046903 | 2/2003 |
| JP | 2003101905 | 4/2003 |
| JP | 2003522974 | 7/2003 |

(Continued)

OTHER PUBLICATIONS

International Search Report dated Mar. 18, 2008.

(Continued)

*Primary Examiner* — Amr Awad
*Assistant Examiner* — Andre Matthews
(74) *Attorney, Agent, or Firm* — Plumsea Law Group, LLC

(57) ABSTRACT

Provided is a head mount display of a type of being attached to eyeglasses. The head mount display (1) includes a case (10) incorporating a display and free-form surface prisms (20). A nose pad (30) is attached to the case (10) of the head mount display (1). The head mount display (1) is used with the case (10) being attached to a bridge (105) of eyeglasses (100). On such an occasion, the nose pad (30) attached to the case (10) functions as the nose pad for the eyeglasses (100).

7 Claims, 7 Drawing Sheets

(56) References Cited

FOREIGN PATENT DOCUMENTS

| JP | 2003337298 | 11/2003 |
|---|---|---|
| JP | 2004309984 | 11/2004 |
| JP | 2006-126590 A | 5/2006 |
| JP | 2006153967 | 6/2006 |

OTHER PUBLICATIONS

Chinese Office Action dated Oct. 10, 2012 in Chinese Patent Application No. 200780051861.0.

Office Action mailed Feb. 5, 2013 in U.S. Appl. No. 12/521,465.

International Search Report & Written Opinion dated Apr. 15, 2008 in International Application No. PCT/JP2007/075374.

Notification of Transmittal of Translation of the International Preliminary Report mailed Jul. 16, 2009 in PCT Application No. PCT/JP2007/075374, including Written Opinion of the International Searching Authority.

Notification Concerning Transmittal of International Preliminary Report on Patentability mailed Jul. 9, 2009 in PCT Application No. PCT/JP2007/075374.

\* cited by examiner

HEAD-MOUNTED DISPLAY

TECHNICAL FIELD

The present invention relates to a head mount display used while being mounted to a user's head.

BACKGROUND ART

A head mount display, which is mounted to a part of a body such as a head during use, for displaying an image in front of the user's eyes, is used in various fields for displaying an image, which includes a field of virtual reality. Generally, the head mount display is formed into a goggle-like shape or into a large eyeglass-frame shape. Further, there is also available a head mount display of a type which is detachable to an attachment member having an eyeglass-frame shape and used while being attached to the attachment member (hereinafter, referred to as "attachment-type head mount display (HMD)"). The attachment member in this case includes a commercially available eyeglasses.

Examples of the attachment-type HMD include one adopting a type of being attached to the outer side of the attachment member (a part father from the user's head with respect to the frame of the attachment member, for example, a part in front of the eyeglass lenses) and one adopting a type of being attached to the inner side of the attachment member (a part closer to the user's head with respect to the frame of the attachment member, for example, a space between the eyeglass lenses and the user's eyes). In the HMD of a type of being attached to the outer side of the attachment member, there is formed a large space on the outer side of the attachment member, and hence it is easy to perform the attachment itself to the attachment member. However, for example, at the time of being located in front of the eyeglass lenses, the HMD is inferior in terms of design and fashion. In contrast, while the HMD of the type of being attached on the inner side of the attachment member is superior in terms of design and fashion, it is necessary to devise how to attach the HMD to the attachment member owing to the problem with the space.

Design and fashion cannot be ignored in terms of popularization of the HMD. Under the circumstance, the inventor of the subject application has been conducting studies on the HMD of the type of being attached on the inner side of the attachment member.

In the case of arranging the HMD on the inner side of the attachment member, difficulty in downsizing the HMD is most problematic. For example, the HMDs of the type of being attached on the inner side of the eyeglasses have ever been proposed, and some of the HMDs are disclosed in Patent Documents and the like. However, under the present circumstances, needless to say that commercialization of the HMDs has not been achieved yet, even prototypes thereof have not been satisfactorily completed yet. To that extent, it is difficult to downsize the HMDs and reduce the fore-and-aft thickness thereof (corresponding to the fore-and-aft direction of the user's face in the case where the HMD is mounted to the user's head, which is the same in the subject application).

Therefore, when the HMD is arranged on the inner side of the attachment member, the attachment member such as eyeglasses somewhat gets away from the user's face (approximately from several millimeters to several centimeters).

In such a case, a nose pad is problematic. This is because, in many cases, while the attachment member is provided with a nose pad similar to that of normal eyeglasses for the purpose of being fixed to the user's head, the nose pad becomes useless when the attachment member gets away from the user's face, with the result that it is difficult to fix the attachment member to the user's head.

[Patent Document 1] JP 2001-133724 A

The present invention has been made to solve the above-mentioned problems. It is therefore an object of the present invention to provide a technology for enabling use of the nose pad even when the head mount display is attached to the inner side of the attachment member such as eyeglasses.

DISCLOSURE OF THE INVENTION

In order to solve the above-mentioned problems, the inventor of the subject application proposes the following head mount display.

That is, there is proposed a head mount display which is provided with: a display means for displaying an image; and a light guide means for guiding the image displayed by the display means and enlarged at a predetermined magnification to an eye of a user, and which is used while being attached to an attachment member so as to be located on an inner side of the attachment member, the attachment member having an eyeglass shape and mounted to a head of the user. Further, the head mount display includes a nose pad held in contact with a nose of the user while the head mount display is attached to the attachment member mounted to the head of the user.

The head mount display itself is provided with the nose pad. Thus, even when the head mount display is arranged between the attachment member having the eyeglass shape and the face of the user so as to be separated from the face of the user, there is no difficulty in using the nose pad of the head mount display.

As described above, while being useful also in the attachment-type (or later-attachment-type) head mount display, provision of the nose pad to the head mount display is useful in a product of a type in which the head mount display is not detachable to the attachment member, in other words, the head mount display is fixedly attached to the attachment member. For example, when multiple types of attachment members each having an eyeglass shape are prepared, and a head mount display provided with a nose pad is fixed to each of the attachment members, the attachment members can be easily designed.

In other words, the head mount display may be detachably attached to or fixedly attached to the attachment member.

As described above, the head mount display may be detachably attached to the attachment member. In this case, when the head mount display is detached from the attachment member, the nose pad provided to the head mount display cannot be used any longer in the attachment member. The head mount display is configured to be detachable to the attachment member mainly for the purpose of meeting the demand of using the attachment member not only in combination with the head mount display but also by itself. When the nose pad provided in advance to the head mount display cannot be used in the case of using the attachment member by itself, it is necessary to take some measures.

There may be given the following examples as those measures.

For example, the nose pad provided to the head mount display may be detachable to the head mount display, and may be detachable also to the attachment member from which the head mount display is detached. In the present invention, the nose pad provided to the head mount display is attachable to the attachment member from which the head mount display is detached. With this, the nose pad provided to the head mount display can be used also when the head mount display is detached from the attachment member.

Further, there may be prepared another nose pad which can be attached to the attachment member when the head mount display is detached from the attachment member, the another nose pad being different from that provided to the head mount display. In this case, it is unnecessary that the nose pad provided to the head mount display is detachable to the head mount display.

Further, it is also possible to provide in advance another nose pad other than that provided to the head mount display. Note that, in this case, it may be necessary to design the nose pad to be provided to the attachment member in advance so as not to interfere with the head mount display when the head mount display is attached to the head mount display.

In the description hereinabove, while the attachment member and the head mount display are regarded as separated member, those may be regarded as a member combined with each other. In the subject application, a member obtained by combining the attachment member and the head mount display is regarded as a head mount display system.

A head mount display system according to the invention of the subject application includes: an attachment member having an eyeglass shape and mounted to a head of a user; and a head mount display used while being attached to an attachment member so as to be located on an inner side of the attachment member, the head mount display including: a display means for displaying an image; and a light guide means for guiding the image displayed by the display means and enlarged at a predetermined magnification to an eye of a user, in which the head mount display comprises a nose pad held in contact with a nose of the user while the head mount display is attached to the attachment member mounted to the head of the user.

While, the head mount display in the head mount display system of the subject application may be fixedly attached to the attachment member, the head mount display may be detachably attached to the attachment member.

The attachment member may be provided with temples, and the temples may be formed as straight temples. An attachment member constituted in a shape of eyeglasses includes temples as those of eyeglasses in many cases. Most general temples provided to the eyeglasses are bent downward such that leading end parts (end covers) thereof are easily fitted to the ears as seen from the lateral direction. However, there are provided temples of a type in which the end covers are bent little downward. The temples are referred to as the straight temples. When the straight temples are provided as the temples of the attachment member, the following advantage can be obtained. That is, when the head mount display is attached to the attachment member, the attachment member is separated from the face as described above. When the head mount display is detached from the attachment member, the attachment member comes close to the face. When the attachment member moves in the fore-and-aft direction as described above, the end covers of the temples and the ears of the user interfere with each other, with the end covers of the temples being bent. When the straight temples are provided as the temples, such a situation can be avoided. Thus, excellent feel of use is provided to the user.

The nose pad provided to the head mount display in the head mount display system of the subject application is detachable to the head mount display, and when the nose pad is detached from the head mount display, the nose pad may be detachably attached to the attachment member from which the head mount display is detached.

The attachment member in the head mount display system of the subject application may include another nose pad held in contact with a nose of the user when the attachment member is mounted to the head of the user while the head mount display is detached from the attachment member, the another nose pad being different from that provided to the head mount display.

The head mount display of the present invention may be structured as follows.

For example, in the head mount display of the present invention, when the user wears the attachment member, the display means and the light guide means may be connected to each other while aligning in a lateral direction as seen from the user. The head mount display in which the display means and the light guide means are arranged while aligning in the lateral direction as seen from the user during use can be wholly hidden on the inner side of the attachment member when being arranged on the inner side of the attachment member (on the rear of the eyeglass lenses when the attachment member is eyeglasses). As a result, it is possible to substantially avoid the head mount display from being exposed on the upper and lower sides of the attachment member. This is advantageous in sophisticating design and fashion of the head mount display.

The head mount display may be attached to the attachment member such that the display means are located in the middle of the lateral direction of the attachment member (when the attachment member is provided with the eyeglass lenses, at the center position therebetween). The head mount display at the time of being attached to the attachment member is located as described above so that the display means are located between both eyes of the user. As a result, the display means completely disappear from the field of view of the user (the user becomes unable to clearly recognize the display means).

Examples of the available light guide means include free-form surface prisms in each of which the image (image light for displaying the image) is reflected by a predetermined number of times so as to be guided to the eye of the user. With use of the free-form surface prisms, it is possible to easily achieve downsizing of the whole of the head mount display. Each of the free-form surface prisms may have four surfaces constituted by a first surface, a second surface, a third surface, and a fourth surface, in which the light from the display means is passed through the first surface, the light having been passed through the first surface is reflected by the second surface, the light having been reflected by the second surface is reflected by the third surface, and the light having been reflected by the third surface is passed through the fourth surface so that the light guided into the insides thereof is changed in direction and the image displayed on the display means is enlarged. Note that, while the first through fourth surfaces in this case may not be continuous with each other, at least two of the first through fourth surfaces (second and fourth surfaces, for example) may be smoothly continuous with each other so as to constitute one surface. As a matter of course, the light guide means are not limited to the free-form surface prisms, and each may be constituted by an optical element having a function of changing the direction of the image light for displaying the image (for example, this is achieved by a reflecting mirror) and a function of enlarging the image (for example, this is achieved by a lens). In this case, the light guide means may be constituted by combination of multiple optical elements.

The head mount display according to the invention of the subject application may be provided with a movement mechanism for sliding the display means and the light guide means between end pieces and a bridge of the attachment member. With the provision of the movement mechanism, a position of the image output from each of the light guide means is variable. Thus, the image can be provided at the optimum position for the eye of the user. The movement mechanism may include a rack part having one end connected to the display means, and a pinion part capable of being manipulated by the user. Rotation of the pinion part causes the rack part to be slid so as to slide the display means and the light guide means.

Further, the head mount display may further include an adjustment mechanism for enabling the display means to move in a direction of the light guide means. With this configuration, by optimizing the distance between the display means and the light guide means in accordance with the user's eyesight, it is possible to provide an image subjected to eyesight correction to the user.

BEST MODE FOR CARRYING OUT THE INVENTION

In the following, a preferred embodiment of the present invention is described in detail with reference to figures.

Figure 1:
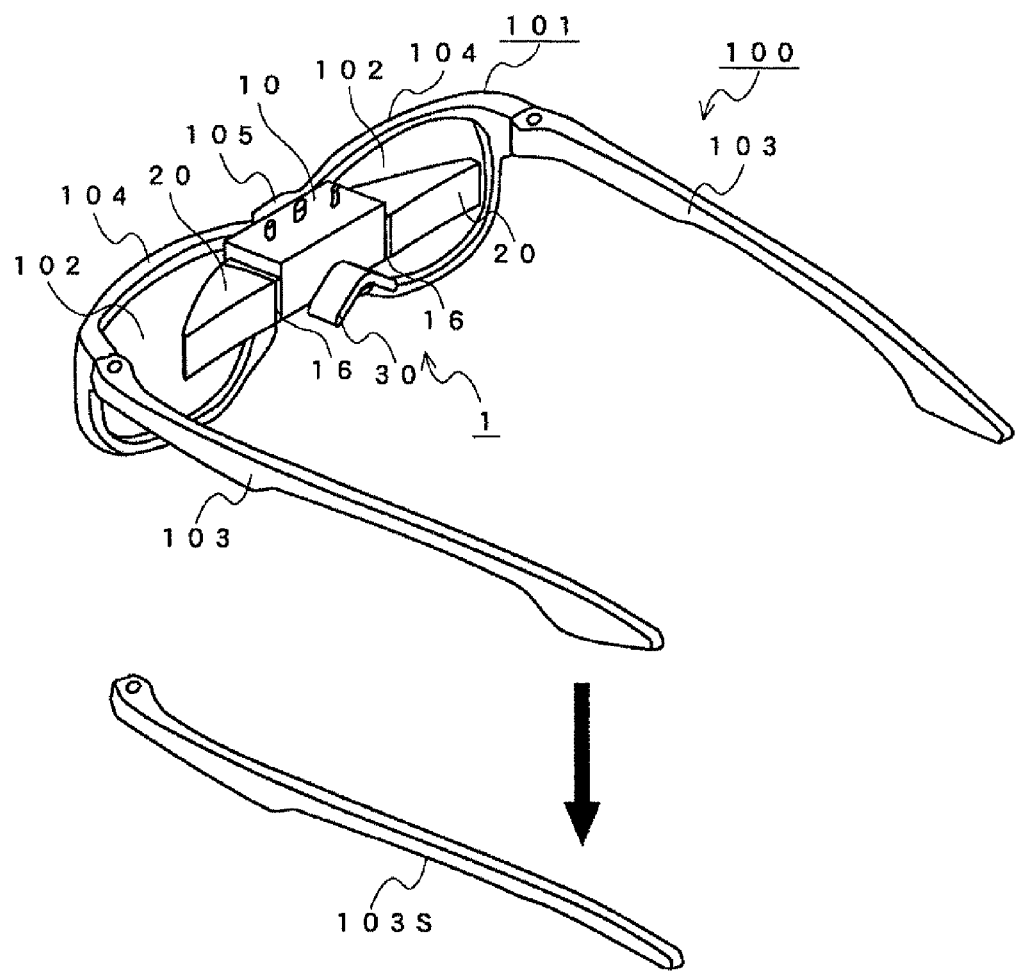
FIG. 1 is a view of a state in which a head mount display according to the embodiment of the present invention is attached to eyeglasses.

A head mount display 1 in this embodiment is an attachment-type HMD used while being attached to eyeglasses 100 having an eyeglass frame shape as illustrated in FIG. 1. In this embodiment, the head mount display 1 is attached on the rear of the eyeglasses 100. During use, the head mount display 1 is situated in a space between the user's face and the eyeglasses 100. Therefore, those other than the user are less likely to find the presence of the head mount display 1.

The eyeglasses 100 correspond to an attachment member of the present invention, and has the same structure as that of conventional pairs of eyeglasses, in which eyeglass lenses 102 are fitted to an eyeglass frame 101. Note that, the eyeglass lenses 102 may be prescribed or unprescribed, and may be transparent-and-colorless or transparent-and-colored. The eyeglass frame 101 is provided with left and right temples 103, left and right rims 104, and a bridge 105 for coupling the left and right rims 104 with each other. The left and right temples 103 are respectively hinged to the left and right rims 104 so that the temples 103 can be folded in a direction parallel to the rims 104. By respectively fitting leading ends of the temples 103 to both ears of the user or by sandwiching the head of the user with the two temples 103, the eyeglasses 100 are fixed to the head of the user.

In this embodiment, the head mount display 1 attached to the eyeglasses 100 is located on the rear of the eyeglasses 100, and then the eyeglasses 100 inevitably move forward from the user's face. Thus, the temples 103 is set to be somewhat longer in length than that of the normal eyeglass frame so that the temples 103 are fitted to the user's ears even in this state.

Note that, in the example illustrated in FIG. 1, while the leading ends of the temples 103 are bent downward so as to be easily fitted to the user's ears, the leading ends of the temples 103 may be linear. In other words, the temples 103 may include straight temples. When the straight temples are used as the temples 103, regardless of whether or not the head mount display 1 is attached to the eyeglasses 100, it is possible to more constantly maintain the user's sense with respect to the temples 103. In FIG. 1, an example of the temples 103 according to a modification in which the straight temples are used is denoted by 103S.

The head mount display 1 is provided with a case 10 having displays therein, left and right free-form surface prisms 20 connected to the case 10 through an intermediation of movable parts 16, and a nose pad 30 connected to the case 10.

While this should not be construed restrictively, the case 10 is attached to the bridge 105 of the eyeglasses 100 in this embodiment. The case 10 is situated on the rear of the eyeglasses 100 when the case 10 is attached to the eyeglasses 100. When the user wears the eyeglasses 100, the free-form surface prisms 20 are connected to the case 10 while aligning in the lateral direction of the case 10 as seen from the user. The nose pad 30 is attached to the case 10 so as to be situated further rearward with respect to the case 10. The nose pad 30 prevents slippage of the eyeglasses 100 by being held in contact with the user's nose when the user wears the eyeglasses 100 attached with the head mount display 1 to the user's head. The images displayed on the displays are enlarged by the free-form surface prisms 20 at a predetermined magnification, and are output rearward from the free-form surface prisms 20. The images output rearward consequently come into sight of the user wearing the eyeglasses 100. In this embodiment, the images are output from the regions of the free-form surface prisms 20, which are surrounded by dotted lines (see FIG. 9).

Figure 2:
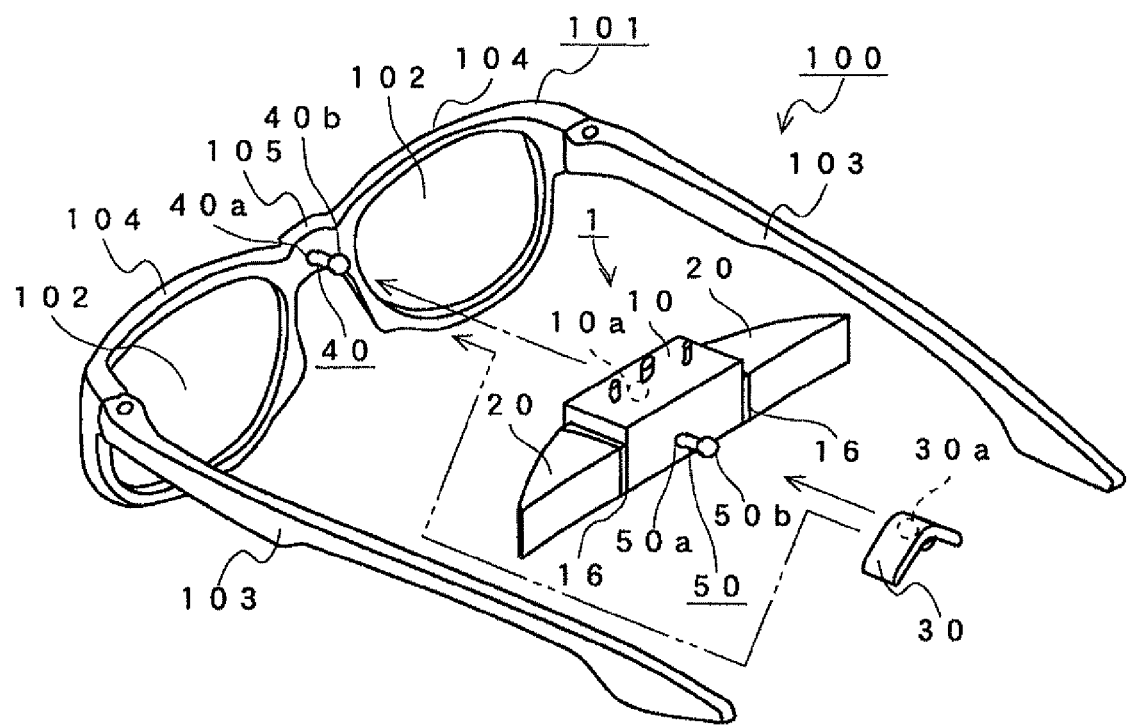
FIG. 2 is an explanatory view of an attachment method for the head mount display to the eyeglasses.

As illustrated in FIG. 2, the head mount display 1 is attached to the eyeglasses 100. A first attachment member 40 is formed on the bridge 105 of the eyeglasses 100. In this embodiment, the first attachment member 40 is constituted by a first shaft part 40a connected to the bridge 105 and a first ball part 40b provided at a leading end of the first shaft part 40a. The first attachment member 40 may be formed integrally with the eyeglasses 100. However, in a case where general eyeglass frames are used for the eyeglasses 100, the first attachment member 40 is formed as a separate member as a matter of course. In this case, the first attachment member 40 is attached to the eyeglasses 100 by adhesive or the like.

In the case 10 of the head mount display 1, in detail, in a surface of the side facing the eyeglasses 100 when the head mount display 1 is attached to the eyeglasses 100, a first fitting hole 10a is formed. At the time of attachment of the head mount display 1 to the eyeglasses 100, the first ball part 40b of the first attachment member 40 is fitted into the first fitting hole 10a. Those constitute, what is called, a ball joint.

Further, in a surface opposite to the surface in which the first fitting hole 10a of the case 10 is formed, there is formed a second attachment member 50 of the same configuration and size as that of the first attachment member 40. The second attachment member 50 is constituted by a second shaft part 50a connected to the case 10 and a second ball part 50b provided at a leading end of the second shaft part 50a. The second attachment member 50 may be formed integrally with the case 10, or may be attached to the case 10 by adhesive or the like.

In a side of the nose pad 30, which is connected to the case 10, there is formed a second fitting hole 30a. The second fitting hole 30a has the same size as that of the first fitting hole 10a. At the time of attachment to the case 10 of the nose pad 30, the second ball part 50b of the second attachment member 50 is fitted into the second fitting hole 30a. Those constitute, what is called, a ball joint.

The first attachment member 40 and the second attachment member 50, and the first fitting hole 10a and the second fitting hole 30a are formed to have the same shapes and sizes, respectively. Therefore, it is also possible to fit the first ball part 40b of the first attachment member 40 into the second fitting hole 30a. With this, it is also possible to omit the case 10, the movable parts 16, and the free-form surface prisms 20, and possible to directly attach only the nose pad 30 to the eyeglasses 100. By combining the eyeglasses 100 and the nose pad 30 with each other, it is possible to use the same as normal eyeglasses.

Next, detailed description is made on the head mount display 1.

Figure 3:
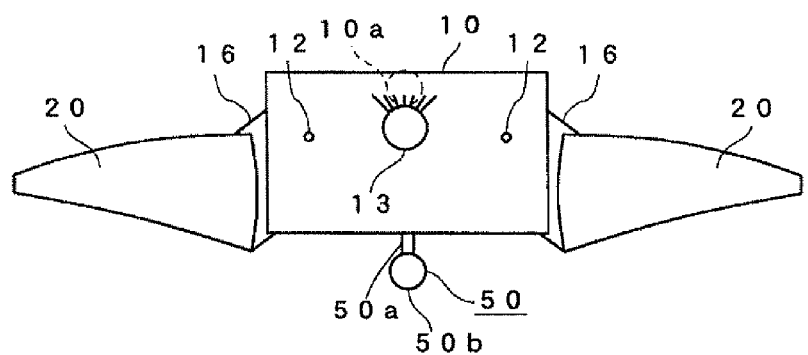
FIG. 3 is a top view of a case.

FIG. 3 is a view in which the head mount display 1 is seen from the upper side of FIG. 1.

The case 10 is hollow and substantially rectangular. While the case 10 is made of a resin in this embodiment, this should not be construed restrictively. On a top surface of the case 10, there are provided eyesight adjustment knobs 12 for adjusting eyesight and a prism position adjustment knob 13 for adjusting the positions of the free-form surface prisms 20.

Through the operation of the eyesight adjustment knob 12, the display in the case 10 is advanced and retracted in the optical axis direction of the image. In this embodiment, two eyesight adjustment knobs 12 are provided so that eyesight of the respective left and right eyes can be adjusted.

Through the operation of the prism position adjustment knob 13, the positions of the free-form surface prisms 20 with respect to the case 10 are moved within a predetermined range. Scales are provided in the vicinity of the prism position adjustment knob 13 so as to allow intuitive confirmation of the movement amount of the free-form surface prisms 20 in accordance with the operation amount of the prism position adjustment knob 13.

Figure 4:
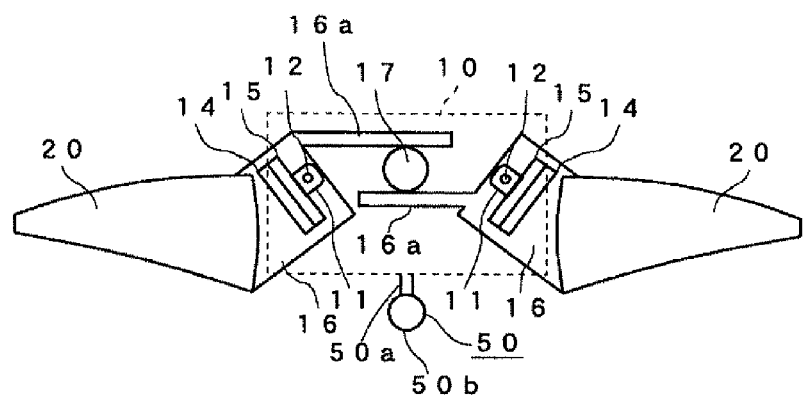
FIG. 4 is a partial sectional view of an inner structure of the case.

FIG. 4 is a partial sectional view of the inside of the case 10, in which the case 10 is viewed from the upper surface thereof.

In the case 10, there are provided the eyesight adjustment knobs 12, eyesight adjustment plates 11, displays 14, control boards 15, the movable parts 16 incorporating the eyesight adjustment knobs 12, the eyesight adjustment plates 11, the displays 14, and the control boards 15 and coupled with the free-form surface prisms 20, and a pinion part 17.

In this embodiment, while description has been made on the premise that there are provided two movable parts 16 and two free-form surface prisms 20, this should not be construed restrictively, and one movable part 16 and one free-form surface prism 20 may be provided. In other words, the head mount display 1 is not necessarily provided for both eyes, and may be provided for the right eye or the left eye while being provided only with a movable part 16 and a free-form surface prism 20 which are provided for each of the right eye or the left eye.

The displays 14 are provided for displaying images. In this embodiment, rectangular liquid crystal displays are provided. However, this should not be construed restrictively. When a user wears the eyeglasses 100, the shorter-side direction of the displays 14 corresponds to the fore-and-aft direction and inclined with respect to the width direction of the eyeglass lenses 102 as seen from the user. The displays 14 are attached to the movable parts 16 such that an image is incident at a predetermined angle onto one surface of each of the free-form surface prisms 20.

The control boards 15 are provided for controlling images displayed on the displays 14. The control boards 15 send data for displaying images to the displays 14 so that appropriate images are displayed on the displays 14. The control boards 15 receive data of images from an external device (not shown), and the images are displayed on the displays 14. The control boards 15 are provided for receiving the data of images from the external device (not shown) by a wired or wireless means.

Examples of the available external device may include a hard-disc player, a DVD player, a TV broadcasting tuner, a personal computer, a mobile phone, a game device for executing computer games, and an MP3 player provided with an image processing function.

The displays 14 and the free-form surface prisms 20 are attached to the movable parts 16 such that light from an image to be displayed on each of the displays 14 is incident at a predetermined angle onto one surface of each of the free-form surface prisms 20.

The movable parts 16 are provided with rack parts 16a so as to allow contact with the pinion part 17. Each of the rack parts 16a is provided with teeth on the surface facing the pinion part 17.

The pinion part 17 is coupled with the prism position adjustment knob 13, and when the prism position adjustment knob 13 is rotated, the pinion part 17 rotates in accordance with the rotation of the prism position adjustment knob 13. The pinion part 17 has a columnar shape, and is provided with teeth on the side surface thereof parallel to the axial direction of the column. The teeth of the pinion part 17 and the teeth of the rack parts 16a mesh with each other. Therefore, when the pinion part 17 rotates, the rack parts 16a move along with the length direction of the rack parts 16a in accordance with the rotation amount and direction of the pinion part 17.

Figure 5:
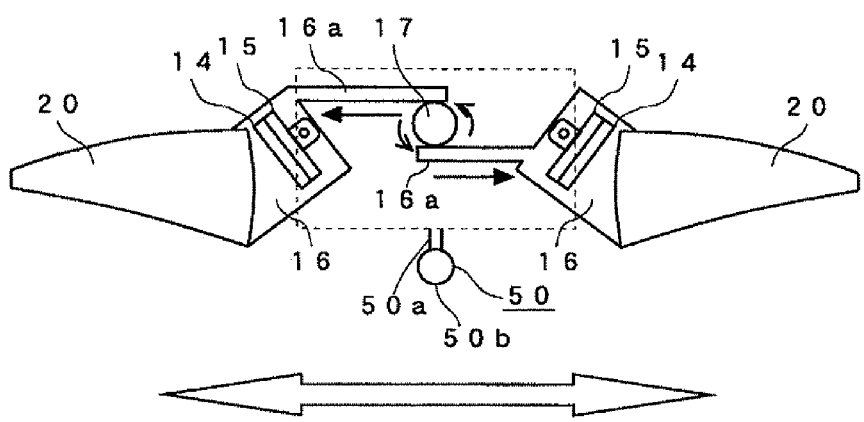
FIG. 5 is an explanatory view of an operation of a movement mechanism.

As illustrated in FIG. 5, when the prism position adjustment knob 13 is rotated counterclockwise, the proximal ends of the rack parts 16a move in a direction of being separated from the pinion part 17, and hence the two movable parts 16 are slid in a direction of being separated from each other. In contrast, when the prism position adjustment knob 13 is rotated clockwise, the proximal ends of the rack parts 16a move toward the pinion part 17, and hence the two movable parts 16 are slid in a direction of coming close to each other. The movable parts 16 and the free-form surface prisms 20 are coupled with each other, and hence, in accordance with the sliding of the movable parts 16, the free-form surface prisms 20 are similarly slid. As described above, with the rotation of the prism position adjustment knob 13, even when the case 10 is attached to the eyeglasses 100, the free-form surface prisms 20 attached to the movable parts 16 can be slid between the bridge 105 and end pieces of the eyeglasses 100. In accordance with the sliding of the free-form surface prisms 20, the positions of the images output from the free-form surface prisms 20 are slid. With this, the positions of outputting the images can be adjusted to the positions of the user's eyes. In this embodiment, with the above-mentioned mechanism, through operation of the one prism position adjustment knob 13, the two free-form surface prisms (light guide means) 20 can be moved simultaneously and symmetrically. While being realized without the above-mentioned mechanism, it is anyway convenient to perform the simultaneous and symmetrical movement of the light guide means in accordance with the distance between eyes.

Note that, the pinion part 17 may be constituted integrally with the prism position adjustment knob 13.

Figure 6:
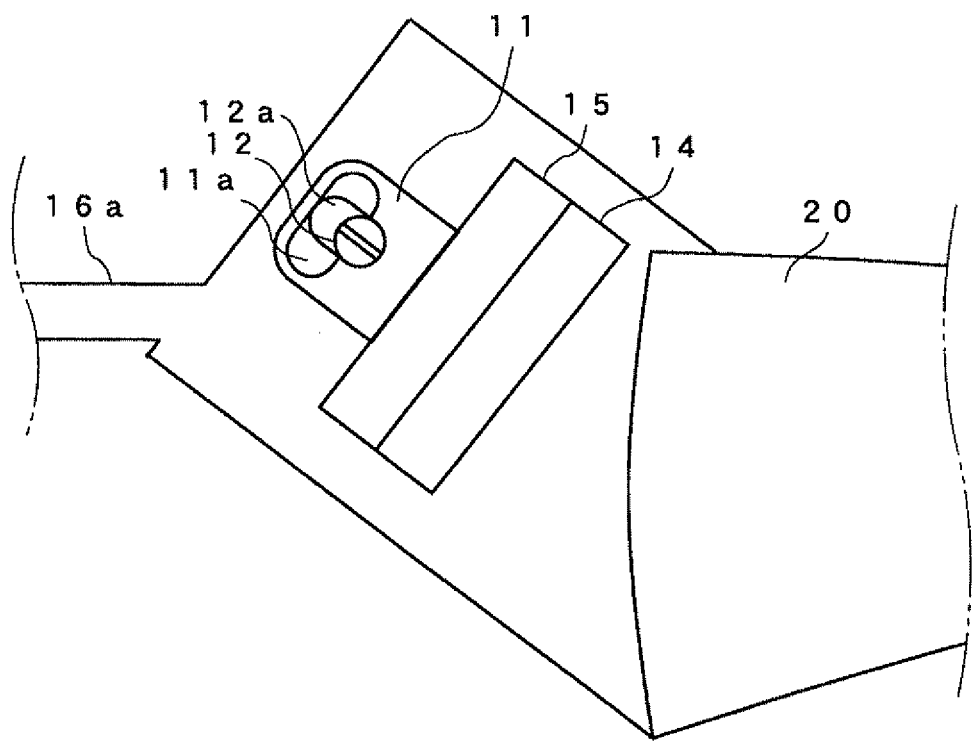
FIG. 6 is a detailed structural view of an adjustment mechanism.
Figure 7:
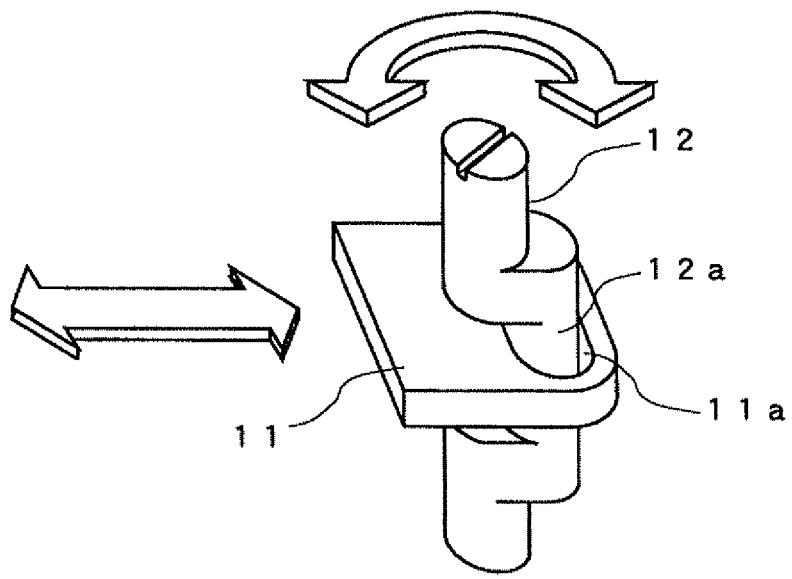
FIG. 7 is an explanatory view of an operation of the adjustment mechanism.

The eyesight adjustment knobs 12 and the eyesight adjustment plates 11, which are incorporated in the movable parts 16, constitute an adjustment mechanism for providing images in accordance with the user's eyesight by fluctuating the distances between the displays 14 and the free-form surface prisms 20. FIG. 6 is a view for describing the adjustment mechanism in detail by enlarging one of the movable parts 16. FIG. 7 is a view describing the operation of the adjustment mechanism.

Each of the eyesight adjustment knobs 12 is provided with a groove in a head portion thereof protruding toward the outside of the case 10, and has a crank part 12a formed by bending the midway of each of the eyesight adjustment knob 12 in a crank shape. When a flat plate is inserted into the groove of the head portion thereof, and then rotated, the crank part 12a is rotated about the rotation center.

Each of the eyesight adjustment plates 11 has one side connected to each of the control boards 15, and is provided with a chamfered rectangular adjustment hole 11a in the vicinity of the side opposed to the one side. The adjustment hole 11a has longer sides which extend in the same direction as that of the one side of each of the eyesight adjustment plates 11. The crank part 12a of each of the eyesight adjustment knobs 12 passes through the adjustment hole 11a. Shorter sides of the adjustment hole 11a are formed to have a length in accordance with the size of the crank part 12a.

When each of the eyesight adjustment knobs 12 is rotated in the state of FIG. 7, the crank part 12a is rotated about the rotation center. The crank part 12a is passed through the adjustment hole 11a, and hence, when the crank part 12a is rotated, the adjustment hole 11a is urged in the direction of each of the control boards 15 in accordance with the movement of the crank part 12a. Therefore, the eyesight adjustment plates 11 move in the direction of urging the control boards 15. When the control boards 15 move, the displays 14 move in the directions of the free-form surface prisms 20. By fluctuating the distances between the displays 14 and the free-form surface prisms 20, it is possible to adjust eyesight of the images in accordance with the eyesight of the user.

The eyesight adjustment knobs 12 are rotated, and hence the eyesight adjustment plates 11 exhibit piston-like movement. Thus, it is impossible for the displays 14 to excessively move so as to collide against the free-form surface prisms 20, to thereby suffer breakage each other. A user can adjust the displays 14 to the positions optimum for the eyesight of the user's eyes by turning the eyesight adjustment knobs 12 during use.

Figure 8:
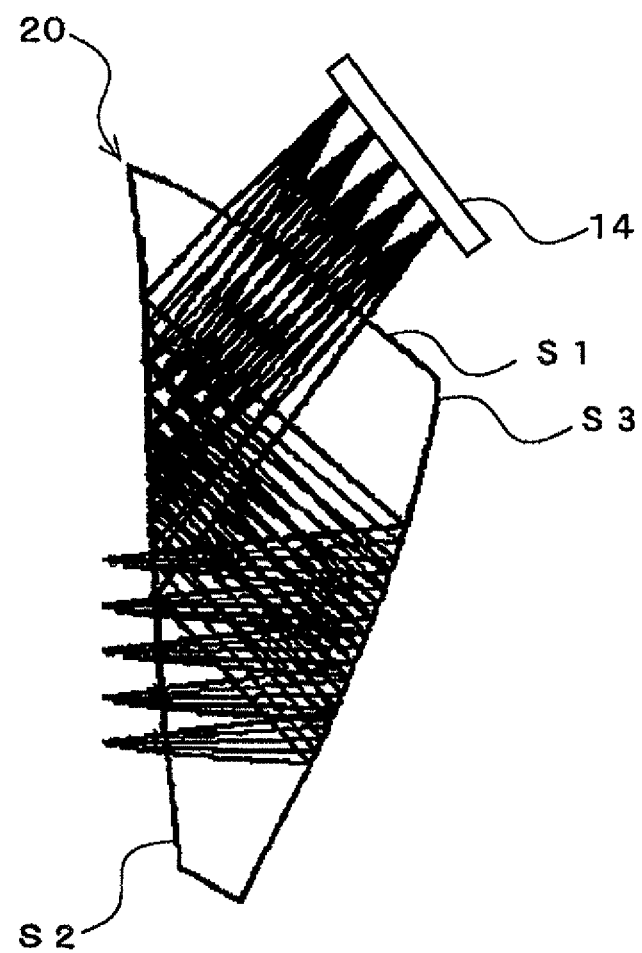
FIG. 8 is an explanatory view of a light guide path in a free-form surface prism.

FIG. 8 is a view for describing a light guide path of each of the free-form surface prisms 20. Each of the free-form surface prism 20 is provided for guiding light from each of the displays 14 to at least one of user's eyes and enlarging the images displayed on each of the displays 14.

Each of the free-form surface prisms 20 has a shape substantially triangular in cross-section, that is, has three surfaces constituted by a first surface S1, a second surface S2, and a third surface S3, which are respectively free-form surfaces.

The first surface S1 is faced with each of the displays 14 so as to transmit the light of the image displayed on each of the displays 14 and to guide the same into the inside of each of the free-form surface prisms 20, the light being emitted from each of the displays 14. The light from each of the displays 14 is refracted at the time of passing through the first surface S1 and varies so as to enlarge the image displayed on each of the displays 14.

The second surface S2 reflects (normally, totally reflects) the light having passed through the first surface S1. The light having passed through the first surface S1 is reflected by the second surface S2 so as to greatly change in direction, and varies so as to enlarge the image displayed on each of the displays 14. The second surface S2 also transmits the light having been reflected by the third surface S3. Description thereof is made in the following.

The third surface S3 reflects the light having been reflected by the second surface S2. The light having been reflected by the second surface S2 is reflected by the third surface S3 so as to greatly change in direction, and varies so as to enlarge the image displayed on each of the displays 14. Note that, the reflection performed on the third surface S3 may be total reflection or reflection by metal. When the reflection performed on the third surface S3 is the total reflection, the curved surface of the third surface S3 is designed such that an incident angle in the case where the light having been reflected by the second surface 52 reaches the third surface S3 is equal to or lower than the total-reflection angle. When the reflection performed on the third surface S3 is the reflection performed by metal, metal is caused to adhere to the outer side of the third surface S3, for example, by deposition. Note that, instead of causing metal to adhere to the outer side of the third surface S3, a dielectric multilayer film may be formed thereon. The reflection in this case is performed by the dielectric multilayer film.

Figure 9:
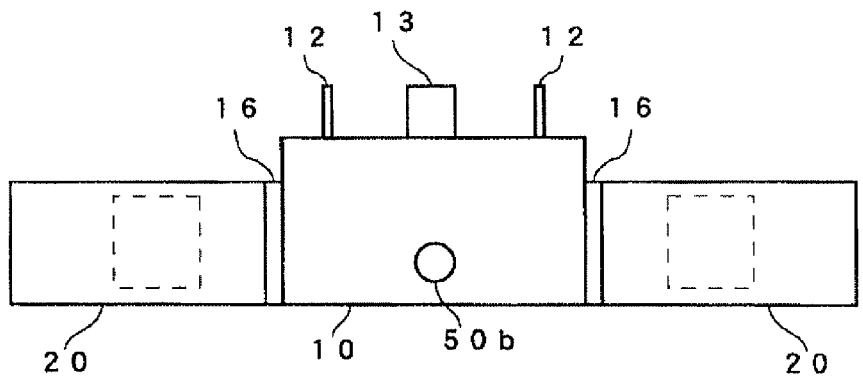
FIG. 9 is a rear view of the head mount display according to the embodiment of the present invention.

The light having been reflected by the third surface S3 as described above is re-directed to the second surface S2 so as to pass through the second surface S2. The light passing through the second surface S2 is refracted at the time of passing through the second surface S2 and varies so as to enlarge the image displayed on each of the displays 14. As illustrated in FIG. 9, the image displayed on each of the displays 14 is to be displayed in the dotted line portion of each of the free-form surface prisms 20.

When the case 10 is attached to the eyeglasses 100, at least a part of the free-form surface prisms 20 as described above is situated in front of one of the user's eyes during use of the head mount display 1, and is connected to the case 10 so as to emit light from the displays 14 into the user's eyes.

The free-form surface prisms 20 are arranged while being connected to the case 10 not in the fore-and-aft direction but in the lateral direction as seen from the user wearing the eyeglasses 100. That is, the entire shape of the head mount display 1 extends in the lateral direction.

Figure 10A:
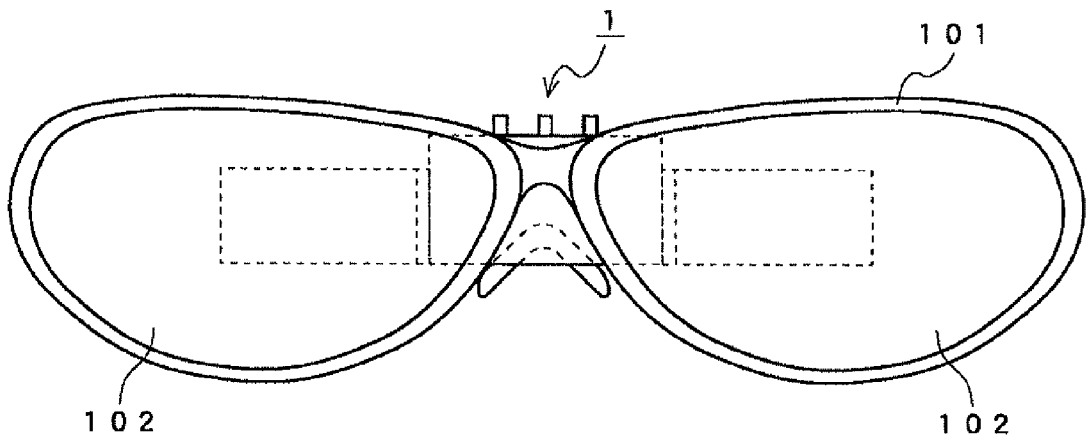
FIG. 10a is a front view of the eyeglasses in a state of being attached with the head mount display according to the embodiment of the present invention.
Figure 10B:
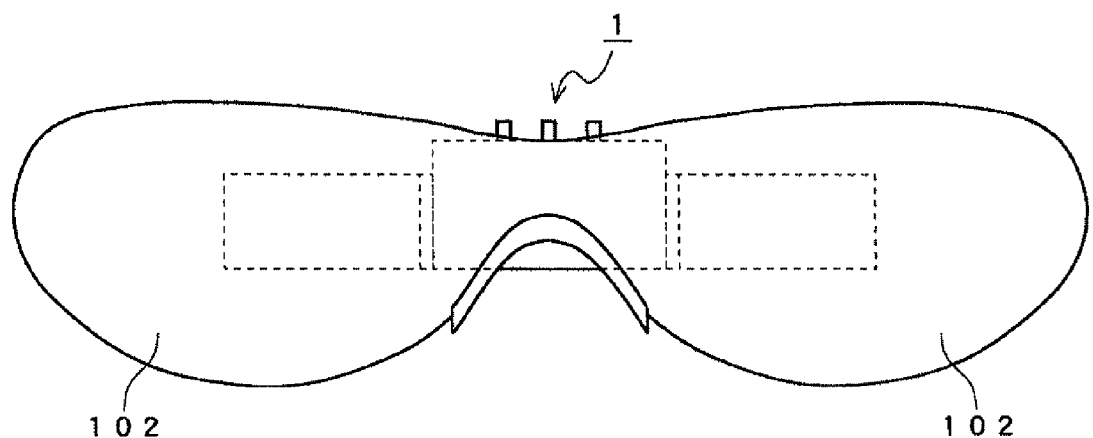
FIG. 10b is a front view of the eyeglasses in a state of being attached with the head mount display according to the embodiment of the present invention.

FIGS. 10a and 10b illustrate respectively the eyeglasses 100 attached with the head mount display 1 as seen from the front thereof.

As illustrated in those figures, when the eyeglasses 100 attached with the head mount display 1 are seen from the front thereof, the head mount display 1 substantially hide in the rear of the eyeglass lenses 102.

In the head mount display 1 in this embodiment, the main body 10 is connected to the free-form surface prisms 20 while aligning in the lateral direction. When the case 10 is attached on the rear of the eyeglasses 100, it is possible to cause almost all the head mount display 1 to be invisible from the front of the eyeglasses 100. That is, it is possible to minimize a protruding amount of the head mount display 1 from the eyeglasses 100, which does not involve deterioration in design.

Further, the head mount display 1 in this embodiment does not obstruct the user's view in the upper and lower directions, and hence, even in the state of watching the images displayed on the free-form surface prisms 20, the peripheries of the free-form surface prisms 20 are visible although being blurred to some extent. Therefore, it is convenient because simple tasks can be performed even in the state in which eyes are focused on the free-form surface prisms 20. Further, it is safe because steps are visible and the user can walk even in the state in which eyes are focused on the free-form surface prisms 20. In addition, when eyes are averted from the free-form surface prisms 20, the peripheries become more visible.

Next, description is made on how to use the head mount display 1.

When the head mount display 1 is to be used, the eyeglasses 100 to which the head mount display 1 is attached are fixed to the user's head. The attachment of the head mount display 1 to the eyeglasses 100 is performed by fitting the first ball part 40b of the first attachment member 40 attached to the eyeglasses 100 into the first fitting hole 10a provided to the case 10 of the head mount display 1. Further, as described above, the fixation to the user's head of the eyeglasses 100 to which the head mount display 1 is attached is performed by fitting the temples 103 of the eyeglasses 100 to the user's ears or by sandwiching the user's head with the temples 103 of the eyeglasses 100.

Note that, prior to the fixation of the eyeglasses 100 to the user's head, the nose pad 30 is attached to the head mount display 1 in advance. The attachment of the nose pad 30 to the head mount display 1 is performed by fitting the second ball part 50b of the case 10 of the head mount display 1 into the second fitting hole 30a provided to the nose pad 30.

In this state, the user operates the above-mentioned external device so as to input the data of the images to be displayed on the head mount display 1 to the head mount display 1. The control boards 15 display the images on the displays 14 based on the data of the images.

The light of the image displayed on each of the displays 14 exits from each of the displays 14 so as to be input to the first surface S1 of each of the free-form surface prisms 20. In each of the free-form surface prisms 20, as illustrated in FIG. 8, the light is emitted from the second surface S2. Owing to the light emitted therefrom, the user watches image set to have an appropriate size with both eyes of the user.

If necessary, through operation of the eyesight adjustment knobs 12, the user can bring the displays 14 closer to and keep the same away from the free-form surface prisms 20 such that an incident angle of the light from the displays 14 to the free-form surface prisms 20 is not be changed. That is, the displays 14 can be advanced and retracted in the projecting direction (optical axis direction) of the light from the displays. With this, it is possible to perform adjustment such that an image in accordance with the user's eyesight can be displayed.

Further, through operation of the prism position adjustment knob 13, the user can move the free-form surface prisms 20 to the positions suitable to the positions in accordance with the distance between the user's eyes. In this manner, it is possible to appropriately adjust the positions of the free-form surface prisms 20 to the position the user can easily see the images.

Further, by wearing earphones (not shown) on ears, the user can listen to music matching the image.

The user detaches the head mount display 1 from the eyeglasses 100 when the head mount display 1 is not used any longer. Further, the nose pad 30 detached from the head mount display 1 detached from the eyeglasses 100 is attached to the eyeglasses 100. With this, the user can use the eyeglasses 100 as normal eyeglasses.

Note that, the attachment of the nose pad 30 to the eyeglasses 100 is performed by fitting the first ball part 40b of the first attachment member 40 attached to the eyeglasses 100 into the second fitting hole 30a provided in the nose pad 30.

There may be given the following as modifications of the above-mentioned embodiment.

In this embodiment, description has been made on the premise that the case 10 is attached to substantially the center of the bridge 105 of the eyeglasses 100. However, this should not be construed restrictively. The case 10 may be attached to another part of the eyeglasses 100.

Further, as an example of the light guide means of the present invention, the free-form surface prisms 20 each having a substantially triangular shape in cross-section are described in this embodiment. However, it is possible to use other shapes of free-form surface prisms 20 or other configurations except the free-form surface prisms 20 as the light guide means. As the light guide means, any configuration may be adopted as long as at least a part of the light guide means is positioned in front of at least one of the user's eyes during use of the head mount display 1, the light from each of the displays 14 is guided to at least one of the user's eyes, and the images displayed on the displays 14 are enlarged.

For example, there may be adopted a free-form surface prism provided with four surfaces constituted by a first surface, a second surface, a third surface, and a fourth surface, in which the light from each of the displays 14 is passed through the first surface, the light having passed through the first surface is reflected by the second surface, the light having reflected by the second surface is reflected by the third surface, and the light having reflected by the third surface is reflected by the fourth surface, thereby changing the direction of the light guided into the inside thereof, and enlarging the image displayed on each of the displays 14, instead of the free-form surface prisms 20 described above. While the first through fourth surfaces may not be continuous with each other, at least two of the first through fourth surfaces may be smoothly continuous with each other so as to constitute one surface. In the free-form surface prisms 20 described above, the second surface and the fourth surface are smoothly continuous with each other so as to constitute one surface.

Figure 11:
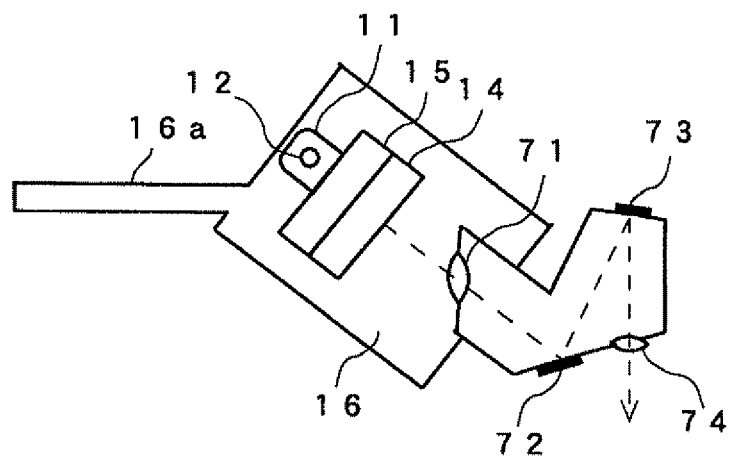
FIG. 11 is a structural view of a modification of the free-form surface prism of the present invention.

Further, as illustrated in FIG. 11, the light guide means of the present invention may include a first lens 71 for enlarging an image from each of the displays 14, a first reflecting mirror 72 for reflecting the light from the first lens 71 and changing the direction of the light, a second reflecting mirror 73 for reflecting the light having been reflected by the first reflecting mirror 72 and changing the direction of the light, and a second lens 74 for transmitting the light from the second reflecting mirror 73 and enlarging the image. The number of reflections and the enlargement degree of the image may be determined based on the positional relation between the displays 14 and the user's eyes.

Figure 12:
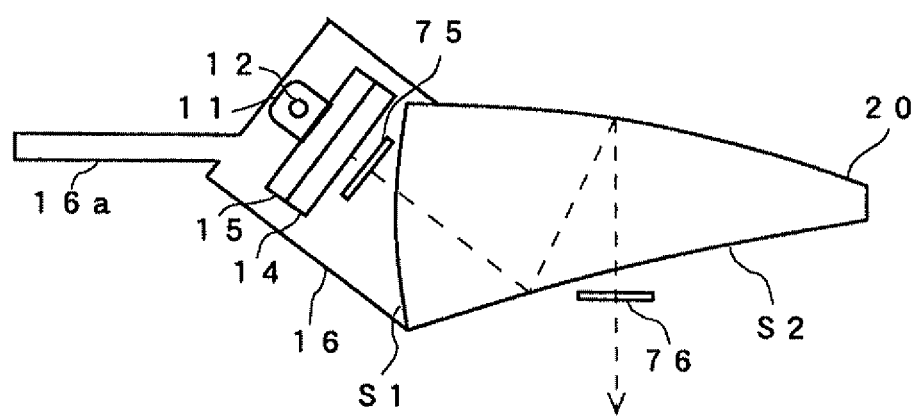
FIG. 12 is a structural view of a modification of the free-form surface prism of the present invention.

Further, as illustrated in FIG. 12, the light guide means may be provided with the free-form surface prism 20 and at least one of the lens 75 and the lens 76. The lenses 75 and 76 are provided for enlarging the image displayed on the display 14. While description has been made on the premise that those lenses 75 and 76 are plate-like lenses, this should not be construed restrictively. Any configuration may be adopted as long as partially changing the refractive index and functioning as a lens. In this case, the lens 75 is attached somewhere between the display 14 and the first surface S1 of the free-form surface prism 20 so that the light from the display 14 is input to the first surface S1 of the free-form surface prism 20 through the lens 75. The light passing through the lens 75 is refracted at the time of passing therethrough, and is changed such that the image displayed on the display 14 is enlarged. That is, with use of the lens 75, the image displayed on the display 14 can be enlarged prior to incidence onto the free-form surface prism 20. Further, the lens 76 is bonded on the outer side of the second surface S2 of the free-form surface prism 20 so that the light from the display 14, which is emitted from the second surface S2 of the free-form surface prism 20, is emitted into the user's eye through the lens 76. The light passing through the lens 76 is refracted at the time of passing therethrough, and is changed such that the image displayed on the display 14 is enlarged. That is, with use of the lens 76, it is possible to enlarge the image projected from the free-form surface prism 20 and displayed on the display 14 to an appropriate size, and possible to project the same into the user's eye.

Further, in this embodiment, the case 10 includes the eyesight adjustment knobs 12 for adjusting eyesight and the prism position adjustment knob 13 for adjusting the positions of the free-form surface prisms 20. However, it is not necessary to provide those components, and hence it is possible to adopt a structure without those components.

Further, in the above-mentioned embodiment, the eyeglasses 100 are detachably attached to the head mount display 1. However, it is unnecessary to detachably fix the head mount display 1 to the eyeglasses 100. At the stage of manufacturing a head mount display system in which the head mount display 1 is attached to the eyeglasses 100, the fixed attachment therebetween may be performed. In this case, the nose pad 30 may be fixedly attached to the case 10 of the head mount display 1. When the head mount display 1 is fixed to the eyeglasses 100, the eyeglasses 100 are constantly used together with the head mount display 1. Thus, it is in particular unnecessary to separate the nose pad 30 from the head mount display 1. Note that, when the attachment of the eyeglasses 100 to the head mount display 1 and the attachment of and the nose pad 30 to the case 10 of the head mount display 1 are fixedly performed, the attachments thereof may be performed by an appropriate method such as bonding with an adhesive or threadable engagement with a screw instead of using the above-mentioned ball joint.

Further, even when the head mount display 1 is detachably attached to the eyeglasses 100, the nose pad 30 can be fixedly attached to the case 10 of the head mount display 1. In this case, when the head mount display 1 is detached from the eyeglasses 100, the nose pad 30 attached to the case 10 of the head mount display 1 cannot be attached to the eyeglasses 100. Thus, it is necessary to prepare another nose pad to be attached to the eyeglasses 100 from which the head mount display 1 is detached, the another nose pad being different from that provided to the head mount display 1. It is sufficient that the nose pad used in this case is structured similarly to the nose pad 30 described in the above-mentioned embodiment. When the nose pad similar to that described in the above-mentioned embodiment is attached to the eyeglasses 100 from which the head mount display 1 is detached, the eyeglasses 100 can be used as normal eyeglasses. Alternatively, it is also possible to fixedly attach in advance another nose pad other than that provided to the head mount display 1. The nose pad may be the same as the nose pad attached to normal eyeglasses as long as being configured to have a shape and a size so as not to hinder the attachment of the eyeglasses 100 to the head mount display 1, and being attached to a position so as not to hinder the attachment of the eyeglasses 100 to the head mount display 1. When the eyeglasses 100 are provided with a nose pad in advance, there is no inconvenience in using the eyeglasses 100 from which the head mount display 1 is detached as normal eyeglasses.

Further, description has been made in this embodiment on the premise that the eyeglasses 100 to which the head mount display 1 is attached are eyeglasses having the bridge 105. However, this should not be construed restrictively. As illustrated in FIG. 10b, eyeglasses without the bridge 105 may be adopted. Further, instead of a commercially available general-purpose product, it is possible to adopt eyeglasses 100 dedicated for the head mount display 1. For example, it is possible to adopt eyeglasses incorporating earphones in the temples of the eyeglasses 100.

The invention claimed is:

1. A head mount display comprising:
a display means for displaying an image; and
a light guide means for guiding the image displayed by the display means and enlarged at a predetermined magnification to an eye of a user, and which is used while being attached to an attachment member so as to be located on an inner side of the attachment member, the attachment member having an eyeglass shape and mounted to a head of the user, the head mount display comprising a nose pad held in contact with a nose of the user while the head mount display is attached to the attachment member mounted to the head of the user,
wherein the head mount display is detachably attached to the attachment member,
wherein the nose pad is detachably attached to the head mount display, and is detachably attachable to the attachment member from which the head mount display is detached,
wherein the head mount display is detachably attached to the attachment member by a first detachable connector, wherein the nose pad is detachably attached to the head mount display by a second detachable connector, and wherein the first detachable connector and the second detachable connector have the same shape and size, and
wherein the first detachable connector and the second detachable connector are ball joints.

2. A head mount display system comprising:
an attachment member having an eyeglass shape and mounted to a head of a user; and
a head mount display used while being attached to the attachment member so as to be located on an inner side of the attachment member, the head mount display comprising:
a display means for displaying an image; and
a light guide means for guiding the image displayed by the display means and enlarged at a predetermined magnification to an eye of a user,
wherein the head mount display comprises a nose pad held in contact with a nose of the user while the head mount display is attached to the attachment member mounted to the head of the user,
wherein the head mount display is detachably attached to the attachment member,
wherein the nose pad provided to the head mount display is detachably attachable to the head mount display, and when the nose pad is detached from the head mount display, the nose pad is detachably attached to the attachment member from which the head mount display is detached, and wherein the head mount display is detachably attached to the attachment member by a first detachable connector, wherein the nose pad is detachably attached to the head mount display by a second detachable connector, and wherein the first detachable connector and the second detachable connector have the same shape and size, and wherein the first detachable connector and the second detachable connector are ball joints.

3. A head mount display system according to claim 2, wherein the attachment member is provided with temples, and the temples are formed as straight temples.

4. A head mount display according to claim 1, wherein the head mount display is detachable from the attachment member without use of tools, and wherein the nose pad is detachable from the head mount display and the attachment member without use of tools.

5. A head mount display comprising:

a display means for displaying an image; and a light guide means for guiding the image displayed by the display means and enlarged at a predetermined magnification to an eye of a user, and which is used while being attached to an attachment member so as to be located on an inner side of the attachment member, the attachment member having an eyeglass shape and mounted to a head of the user, the head mount display comprising a nose pad held in contact with a nose of the user while the head mount display is attached to the attachment member mounted to the head of the user, wherein the head mount display is detachably attached to the attachment member, wherein the nose pad is detachably attached to the head mount display, and is detachably attachable to the attachment member from which the head mount display is detached, wherein the head mount display is detachably attached to the attachment member by a first detachable connector, wherein the nose pad is detachably attached to the head mount display by a second detachable connector, wherein the first detachable connector comprises a first ball part on the attachment member and a first hole defined by the head mount display and configured to receive the first ball part, wherein the second detachable connector comprises a second ball part on the head mount display and a second hole defined by the nose pad and configured to receive the second ball part, wherein the first ball part and the second ball part have substantially the same size and shape, and wherein the first hole and the second hole have substantially the same size and shape.

6. A head mount display system according to claim 2, wherein the head mount display comprises a case containing the display means and the light guide means such that detaching the case from the attachment member simultaneously detaches the display means and the light guide means from the attachment member.

7. A head mount display system comprising:

an attachment member having an eyeglass shape and mounted to a head of a user; and a head mount display used while being attached to the attachment member so as to be located on an inner side of the attachment member, the head mount display comprising:

a display means for displaying an image; and a light guide means for guiding the image displayed by the display means and enlarged at a predetermined magnification to an eye of a user, wherein the head mount display comprises a nose pad held in contact with a nose of the user while the head mount display is attached to the attachment member mounted to the head of the user, wherein the head mount display is detachably attached to the attachment member, wherein the nose pad provided to the head mount display is detachably attachable to the head mount display, and when the nose pad is detached from the head mount display, the nose pad is detachably attached to the attachment member from which the head mount display is detached, wherein the head mount display comprises a case containing the display means and the light guide means such that detaching the case from the attachment member simultaneously detaches the display means and the light guide means from the attachment member, wherein the case of the head mount display is detachably attached to the attachment member by a first detachable connector, wherein the nose pad is detachably attached to the case of the head mount display by a second detachable connector, wherein the first detachable connector comprises a first ball part on the attachment member and a first hole defined by the case of the head mount display and configured to receive the first ball part, wherein the second detachable connector comprises a second ball part on the case of the head mount display and a second hole defined by the nose pad and configured to receive the second ball part, wherein the first ball part and the second ball part have substantially the same size and shape, and wherein the first hole and the second hole have substantially the same size and shape.

\* \* \* \* \*